United States Patent [19]
Fork

[11] 4,015,186
[45] Mar. 29, 1977

[54] SYSTEM FOR LIMITING TORQUE IN A TURBINE-GENERATOR SHAFT

[75] Inventor: Kurt Fork, Rosenbach near Erlangen, Germany

[73] Assignee: Kraftwerk Union Aktiengesellschaft, Mulheim (Rurh), Germany

[22] Filed: Sept. 23, 1975

[21] Appl. No.: 615,842

[30] Foreign Application Priority Data
Oct. 11, 1974 Germany .......................... 2448635

[52] U.S. Cl. ..................................... 322/8; 322/37; 361/21; 361/52
[51] Int. Cl.² ...................... H02H 3/00; H02H 7/06
[58] Field of Search ............... 322/11, 7, 8, 17, 27, 322/37; 317/9 R, 13 R, 20, 21, 22, 25, 36, 36 TD

[56] References Cited

UNITED STATES PATENTS

| | | | |
|---|---|---|---|
| 2,882,372 | 4/1959 | Preissler | 317/25 X |
| 3,234,397 | 2/1966 | Park | 322/8 X |
| 3,786,311 | 1/1974 | Hobson, Jr. et al. | 317/36 TD X |

*Primary Examiner*—Robert J. Hickey
*Attorney, Agent, or Firm*—Herbert L. Lerner

[57] ABSTRACT

In a system for limiting torque occurring in a turbine-generator shaft when a three-pole short circuit is switched off, one pole of a switch that switches-off the short circuit is opened first, and both of the other poles are then opened after the passage of a predetermined delay period.

2 Claims, 1 Drawing Figure

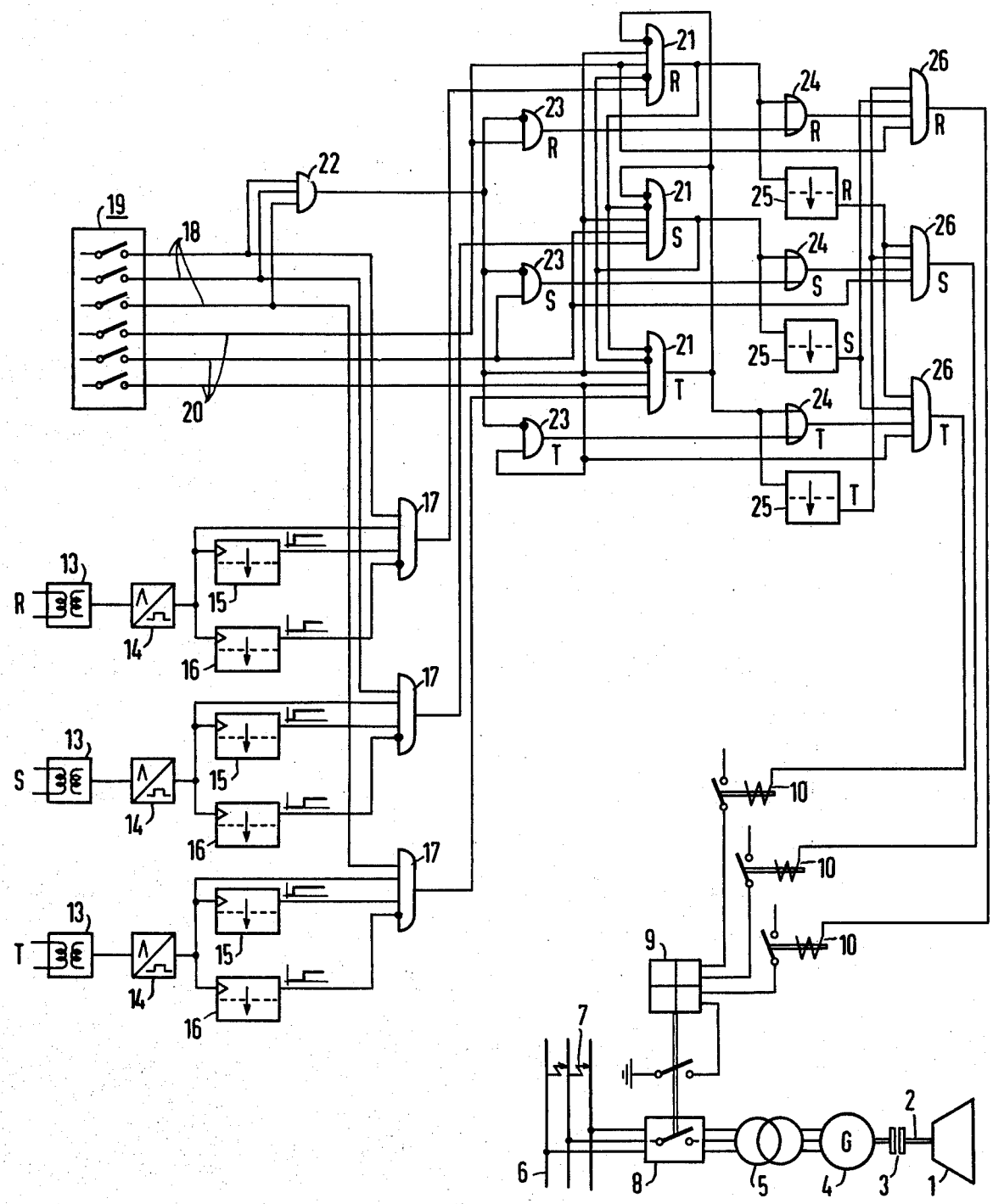

SYSTEM FOR LIMITING TORQUE IN A TURBINE-GENERATOR SHAFT

The invention relates to a system for limiting torque in a turbine-generator shaft.

With ever-increasing power capacities of electrical machines and the turbines driving the same, it becomes increasingly costly to dimension the mechanical components of the turbosets so that sudden or shock loads when failures occur can readily be absorbed thereby.

It is an object of the invention to provide a system for limiting torque in a turbine-generator shaft to minimize high shock loads that are exerted on a shaft which couples a turbine to an electric generator whenever three-pole supply net short circuits are switched off. It is a further object of the invention also to relieve the generator and the turbine, in addition to the shaft, substantially of all sudden stresses applied thereto.

The invention of the instant application is based upon the realization that especially heavy loads are exerted upon the rotating components of turboset when a three-pole supply net short circuit is switched off. The short circuit proper results in, namely, the presence of a relatively large angular difference between the position of the generator rotor and the axis of the rotary field in the generator. Considerable shock loading of the shaft can result therefrom if the short circuit is switched off and the angle difference between the generator voltage and the returning or recovery supply net voltage has a relatively high value. The difference voltage between the voltage induced in the generator and the supply net voltage primarily occurs with generator-related short circuits at very small reactance values and thereby cause high torques in the turboset shaft.

With the foregoing and other objects in view, there is provided in accordance with the invention, a system for limiting the torque produced in a turbine generator shaft when a three-pole electric supply net short circuit is switched off, comprising at least one power switch connected between the generator and a location of a supply net having three phase lines wherein a short circuit is formed, the power switch having a respective switch member for each of the poles of the three-pole supply net and a respective actuating coil for displacing each of the switch members so as to switch off two phase lines with a delay relative to switching off the third phase line that is greater than the duration of a half-wave of the supply net voltage.

Through this feature of the invention, due to the very large reactance remaining effective when first opening only one phase line between the location of the failure and the generator, the otherwise effective torque shock on the turbine-generator shaft is divided into two shocks of substantially half the total amplitude.

It is thereby possible to stress the turbine-generator shaft with a lower torque.

In accordance with another feature of the invention, when switching-off a three-pole supply net short circuit, the one phase line wherein a short circuit current with the smallest d-c component flows is switched-off first, because the switch pole of that one phase line can be switched-off most easily and thereby also most rapidly. A selector device provided for this purpose has the particular advantage that it greatly prevents shut-off difficulties such as occur when switching off a short circuit current with a large d-c component. A longer life-span of the power switch which switches off the short circuit is also produced thereby.

For the case where one does not always wish to provide an inventive device for every power switch serving to switch off a short circuit, it is possible to equip the block switch of a turboset accordingly to provide it with a respective switch-off signal whenever a three-pole supply net short circuit occurs in the vicinity of the turboset. In this case, assurance must be provided that the power switch which is closest to the short-circuit location opens only after the delay period following the opening of the first power-switch pole has ended. The function of opening both phase lines that are to be switched-off after a delay period can then also be assumed by this power switch that is located closest to the short-circuit location. In this case, it is sufficient to open the power switch of the block formed of the turbine, generator and transformer only single-pole in passing.

Other features which are considered as characteristic for the invention are set forth in the appended claims.

Although the invention is illustrated and described herein as embodied in a system for limitng torque in a turbine-generator shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single FIGURE of the drawing which is a circuit diagram of the device for limiting torque in a turbine-genrator shaft in accordance with the invention.

Referring now to the drawing, there is shown therein schematically a turbine 1 connected by a shaft 2 and a clutch 3 to a generator 4. The generator 4 is, in turn, connected to a three-phase electric supply system or net 6 through a high-voltage transformer 5. Although a number of power switches or circuit breakers may be located in the lines between the high-voltage transformer 5 and the location 7 of a possible three-pole short-circuit in the electric supply net 6, only one pole of a circuit breaker or power switch 8 for a single base conductor R is shown in the drawing. The pole of the power switch 8 is provided with a releasing or actuating coil 9 which is energizable through a relay 10. The coil of the relay 10 is connected to a signal line 11 leading to the output of a selector device 12 which is described hereinafter in detail.

The selector device 12 receives through current converters or transformers 13 the currents of the three-phase lines which flow through the latter at the high-voltage side of the high-voltage transformer 5. The currents are transformed in conventional pulse-forming stages 14 to square or rectangular wave pulses which are formed, respectively, at the location at which the current of the individual phase line R, S and T, respectively, passes through zero. A pair of parallel-connected time-delay stages 15 and 16, both of conventional construction, for each of the phase conductors R, S and T, respectively, are after-connected to the respective pulse-forming stage 14. As represented by the respective wave diagrams shown adjacent the diagrammatically illustrated time-delay stages 15 and 16, the stage 15 is set for a briefer delay period than the stage 16, namely the stage 15 effects a delay somewhat less than 10 milliseconds (ms), and the stage 16 somewhat more than 10 ms. This is applicable for the case wherein the frequency of the electric supply system or net is 50 Hz and a half-wave of the supply voltage has a duration of 10 ms. The interval to the normal duration of 10 ms is selected so that normally the square or rectangular wave pulses yielded by the pulse-forming stage 14 always appear when the time-delay stage 15 delivers an output signal, the operating interval of the time delay stage 16 being not yet ended, however. The output line of each pulse-forming stage 14 and the output line of the respective after-connected time-delay stage 15 extend, respectively, to an AND-gate 17. The output of the time-delay stage 16 is connected with signal reversal at the input of the AND-gate 17 provided for the respective phase conductor R, S or T. In addition, the AND-gates 17 receive input signals from respective output lines 18 of a distance or impedance protection device 19 that are provided for "exciting" to distance measuring.

The releasing or actuating lines 20 of the distance protection or safeguarding device 19 extend and are connected to respective AND-gates 21. For each phase, one respective AND-gate 21 is connected to a corresponding AND-gate 17. In addition thereto, each AND-gate 21 has an input that is connected to the output of an AND-gate 22. The AND-gate 22 receives input signals from the output lines 18 of the distance protection or safeguarding device 19 and always transmits a signal from the output thereof if a three-pole supply system short circuit 7 should exist. The AND-gates 21 are so interlocked that each of them which transmits a signal from the respective output thereof blocks the AND-gates 21 provided for the other phase conductors so that no output signal can appear it these other AND-gates 21. Additional AND-gates 23, of which only the one for the phase conductor R is shown in the drawing, are connected through a reversing member to the output of the AND-gate 22 and to the releasing or actuating line 18 of the respective phase conductor R, S or T. The outputs of the AND-gates 23 are conducted to the input of an OR-gate 24 after-connected to the respective AND-gate 21, the OR-gate 24 having an output which acts on the coil of the relay 10 through the line 11. The output of the AND-gate 21 is connected through a respective time-delay stage 25 to the non-illustrated releasing or actuating coil (corresponding to the coil 9) for the poles of the power switch 8 provided in the other phase conductors S and T. The time-delay stages 25 are adjusted to a time interval of about 25 ms to about 40 ms (for a supply system or network frequency of 50 Hz). The delay interval of this time-delay stage 25 should be set to half the duration of the period of torsion of the shaft 2 that extends beyond the duration of the period of the supply system or network. It is accordingly always longer than the duration of a half-wave of the electrical supply system or network frequency. This delay time is to be chosen, depending upon the respective conditions of the electrical supply system or network, so that the phase conductors S and T, for example, that are to be switched off after a time delay, are opened when the torque in the shaft 2 produced by the separation of the first phase conductor R, for example, has exceeded the peak value thereof and swings back.

Assuming that a three-pole supply network short circuit 7 exists so that a releasing or actuating command is given to the power switch 8 by the distance protection device 19 and that, in the current of the phase conductors S and T, a direct-current component is present which is large with respect to the current in the phase conductor R, then both time-delay stages 15 and 16 will transmit signals upon the occurrence of the next square or rectangular-wave pulse at the output of the pulse forming stages 14 in the phase conductors S and T, whereas the time-delay stage 16 of the phase conductor R transmits no signal. The reason for this is that, because of the relatively small direct-current component in the current of the phase conductor R, the interval between a pair of successive zero amplitude points of the current is not lengthened. The AND-gates 17 for the phase conductors S and T thereby receive no signal at the lowermost input thereof shown in the drawing and cannot transmit any output signal. Only the AND-gate 17 for the phase conductor R receives a signal at all inputs thereof and transmits this signal to the AND-gate 21 for the phase conductor S that is after-connected thereto. Since a signal is additionally present at the AND-gate 22 (three-pole excitation) and a releasing or actuating signal is transmitted by the releasing or actuating line 20 for the phase conductor R, a signal also appears at the output of this AND-gate 21. The output of the AND-gate 21 is connected through reversing stages to the remaining AND-gates 21. The latter remaining AND-gates 21 are thus blocked from that instant on. The output signal is further transmitted to the after-connected time-delay stage 25 which opens the power switch poles for the remaining phase conductors after the selected delay interval. Moreover, the output signal is conducted without delay through the OR-gate 24 to the relay 10 and opens the phase conductor R by means of the respective pole of the power switch 8.

For the case wherein the current of a pair of phase conductors is without any appreciable direct-current component, it is left to chance as to which power switch pole is to open first. If no three-pole excitation exists, and a releasing or actuating command for the one or the other phase conductor is present, the AND-gate 23 thus transmits the output signal thereof and releases or actuates the respective pole of the power switch 8.

For the case in which the power switch located closest to the short-circuit location is not applied for the graduated or staggered disconnection, but rather, for opening the line, additionally the switch located nearest to the generator 4 is applied, a further AND-gate 26 can be after-connected to the output of the time-delay stage 25, and AND-gate 26 being connected through a second input to the releasing or actuating line 20 of the distance protection device 19.

In this case, the switch-off signal transmitted by the time-delay stage 25 for the remaining two phase conductors for the power switch 8 located in the vicinity of the generator 4 is effective only if a releasing or actuating signal still exists after termination of the delay time interval of the time-delay stage 25.

There is claimed:

1. System for limiting the torque produced in a turbine generator shaft when a three-pole electric supply net short circuit is switched off comprising at least one power switch connected between the generator and a location of a supply net having three phase lines wherein a short circuit is formed, said power switch having a respective switch member for each of the poles of the three-pole supply net and a respective actuating coil for displacing each of said switch members, and a selector device connected to said actuating coils for actuating the latter to displace said switch members so as to switch off two phase lines with a delay relative to switching off the third phase line that is greater than the duration of a half-wave of the supply net voltage, said selector device comprising measuring means for determining the d-c component of the currents in said phase lines and means for accordingly directing a switch-off signal first to the pole of said power switch that is in the phase line having the smallest d-c component.

2. System according to claim 1 wherein said measuring means for determining the d-c components of the currents in said phase lines comprise time-delay stages for measuring the interval of time between a pair of successive locations at which the current of the respective phase lines passes through zero, and AND-gate means after-connected to said time delay stages for blocking actuating signals to said actuating coils whenever said interval of time is alternatively too great and too small.

* * * * *